(12) United States Patent
Wei et al.

(10) Patent No.: US 11,457,561 B2
(45) Date of Patent: Oct. 4, 2022

(54) GARDEN TOOL

(71) Applicant: Skybest Electric Appliance (Suzhou) Co., Ltd., Jiangsu (CN)

(72) Inventors: Juan Wei, Suzhou (CN); He Tang, Suzhou (CN); Ni Yin, Suzhou (CN)

(73) Assignee: SKYBEST ELECTRIC APPLIANCE (SUZHOU) CO., LTD., Suzhou (CN)

(*) Notice: Subject to any disclaimer, the term of this patent is extended or adjusted under 35 U.S.C. 154(b) by 182 days.

(21) Appl. No.: 16/639,275

(22) PCT Filed: Aug. 14, 2018

(86) PCT No.: PCT/CN2018/100454
§ 371 (c)(1),
(2) Date: Feb. 14, 2020

(87) PCT Pub. No.: WO2019/034050
PCT Pub. Date: Feb. 21, 2019

(65) Prior Publication Data
US 2020/0245554 A1 Aug. 6, 2020

(30) Foreign Application Priority Data
Aug. 14, 2017 (CN) .......................... 201721013235.X (51) Int. Cl.
*A01D 34/416* (2006.01)
*A01D 34/90* (2006.01)
*H01R 13/631* (2006.01)

(52) U.S. Cl.
CPC ........... *A01D 34/416* (2013.01); *A01D 34/90* (2013.01); *H01R 13/631* (2013.01)

(58) Field of Classification Search
CPC ....... A01D 34/416; A01D 34/90; H01D 34/90
(Continued)

(56) References Cited

U.S. PATENT DOCUMENTS 4,748,355 A * 5/1988 Anderson .............. H02K 5/225
310/71
5,802,724 A * 9/1998 Rickard ................. A01D 34/90
30/276
(Continued)

FOREIGN PATENT DOCUMENTS

AU 2006202227 A1 2/2007
CN 2686151 Y 3/2005
(Continued)

OTHER PUBLICATIONS

International Search Report for Application No. PCT/CN2018/100454, dated Nov. 2, 2018.

*Primary Examiner* — Omar Flores Sanchez
(74) *Attorney, Agent, or Firm* — JK Intellectual Property Law, PA (57) ABSTRACT

A garden tool includes a connecting rod assembly, a working head, a power source, a first rod connected to the working head, a second rod connected to the power source, and a connection structure for mechanical and electrical connection between the first and second rods. A first terminal is arranged on the first rod and a second terminal arranged on the second rod, the first terminal being connected to a first wire, the second terminal being connected to a second wire, the first terminal and the second terminal connectable to transmit power of the power source to the working head through the first wire and the second wire. A second base is mounted in the second rod, the second base including at least two jacks independent of each other. At least two second terminals are respectively mounted in respective jacks.

15 Claims, 7 Drawing Sheets

(58) Field of Classification Search
USPC .......................................................... 30/276
See application file for complete search history.

(56) References Cited

U.S. PATENT DOCUMENTS

| | | | | |
|---|---|---|---|---|
| 5,809,653 A * | 9/1998 | Everts | ................... | A01D 34/90 |
| | | | | 15/328 |
| 7,484,300 B2 * | 2/2009 | King | ....................... | A01G 3/08 |
| | | | | 30/166.3 |
| 9,198,347 B2 * | 12/2015 | Nagahama | ............. | A01D 34/78 |

FOREIGN PATENT DOCUMENTS

| | | |
|---|---|---|
| CN | 203934334 U | 11/2014 |
| CN | 207201332 U | 4/2018 |
| JP | 2014147311 A | 8/2014 |

* cited by examiner

GARDEN TOOL

CROSS-REFERENCE TO RELATED APPLICATIONS

This application is a national stage of International Application No. PCT/CN2018/100454, filed on Aug. 14, 2018, which claims priority to CN Patent Application No. 201721013235.X, filed on Aug. 14, 2017. All of the aforementioned applications are hereby incorporated by reference in their entireties.

TECHNICAL FIELD

The disclosure relates to a garden tool, in particular to a garden tool with a two-section rod connection.

BACKGROUND

Grass trimmers are becoming more and more popular as a garden tool for trimming grass. A grass trimmer generally drives a trimmer line to rotate to trim grass, and generally comprises a longitudinally-extended extension rod, a working head arranged at one end of the extension rod, and a handle arranged on the extension rod and spaced from the working head by a certain distance, wherein the working head comprises a housing, a motor arranged in the housing, a cutting member driven by the motor to rotate around a first axis in a working plane, and a shield connected to the housing.

The extension rod may be generally divided into a first partial rod and a second partial rod: the front end of the first partial rod is connected to the working head, and the rear end of the second partial rod is connected to the power supply unit, and when the first partial rod and the second partial rod are coupled to each other, the first partial rod and the second partial rod are mechanically and electrically connected, so that the power supply unit supplies power to the working head.

In case of a garden tool with a two-section rod connection, because the first partial rod and the second partial rod are required to be electrically connected, the electric shock risk exists when a user operates to connect the two rods, and if the insulation of a wire in the rods is failed, the electric shock risk of the user also exists because of the conductivity of the metal connecting rods.

Therefore, there is a need for an improved garden tool to address the above mentioned problems.

SUMMARY

An objective of the present disclosure is to provide a garden tool which allows the working head to operate with direct current or alternating current of 0-125V and has a high electrical safety.

In order to realize the objective, the disclosure describes a garden tool including a connecting rod assembly, a working head connected to one end of the connecting rod assembly and a power source connected to the other end of the connecting rod assembly, wherein the connecting rod assembly includes a first rod connected to the working head, a second rod connected to the power source, and a connection structure for realizing the mechanical connection and electrical connection between the first rod and the second rod, the connection structure includes a first terminal arranged on the first rod and a second terminal arranged on the second rod, the first terminal is connected to a first wire, the second terminal is connected to a second wire, the first terminal and the second terminal are connected to transmit the power of the power source to the working head through the first wire and the second wire, the connection structure further includes a second base mounted in the second rod, the second base includes at least two jacks independent of each other, and at least two second terminals are respectively mounted in respective jacks.

Preferably, the shortest distance from each second terminal to the end surface of the second rod, the end surface being near the distal end of the first rod is at least 15 mm, and the shortest distance from each second terminal to the inner wall of the second rod is not more than 12.5 mm.

Preferably, the second terminals have center lines, and the center line of each second terminal is coincided with the center line of the jack in which the second terminal is located, wherein the shortest distance from the center line of the second terminal to the inner wall of the second rod is not more than 12.5 mm.

Preferably, the jack includes a guiding hole and an assembly hole, the head end of the second terminal is fixed to the assembly hole, and the first terminal can be connected to the second terminal through the guiding hole, wherein the shortest distance from the second terminal to the end surface of the guiding hole where the second terminal is located is at least 3.2 mm, and the diameter of the guiding hole is not more than 6.4 mm.

Preferably, the shortest distance between the second terminal and the end surface of the guiding hole where the second terminal is located is at least 4.8 mm.

Preferably, the guiding hole has a protruding portion extending from the end surface thereof in the direction approaching the first terminal.

Preferably, the protruding portion has a ring shape with a notch.

Preferably, the connection structure further comprises a first base mounted in the first rod, at least two first terminals are included, the at least two first terminals are mutually independently fixed to the first base, the front ends of the first terminals are connected with the first wire, and the rear ends of the first terminals extend out of the first base.

Preferably, the creepage distance between the front ends of the first terminals and the inner wall of the first rod is at least 4.8 mm.

Preferably, the creepage distance between the rear ends of the first terminals and the inner wall of the first rod is at least 4.8 mm.

Preferably, the electrical gap between the front ends of the first terminals and the inner wall of the first rod is at least 2.5 mm.

Preferably, the first base is provided with a groove, the groove is positioned between the front ends of the first terminals and the inner wall of the first rod, and the creepage distance between the front ends of the first terminals and the inner wall of the first rod is formed by the groove.

Preferably, the groove provides a creepage distance of at least 4.8 mm between the front ends of the first terminals and the inner wall of the first rod.

Preferably, the front wire includes at least two first branch wires and a first insulating sheath wrapping the at least two first branch wires, each of the first branch wires has its own second insulating sheath, and each of the first branch wires is partially exposed from the first insulating sheath to be connected to the respective first terminal.

Preferably, the creepage distance between the exposed portion of each first branch wire and the inner wall of the front rod is at least 2.4 mm.

Preferably, the length of the exposed portion of each first branch wire is not more than 10 mm.

Preferably, the second wire includes at least two second branch wires and a third insulating sheath wrapping the at least two second branch wires, each of the second branch wires has its own fourth insulating sheath, each of the second branch wires is partially exposed from the third insulating sheath to be connected to the respective second terminal, the connection structure further includes an insulating sleeve disposed in the second rod, and the exposed portion of each second branch wire is restricted in the insulating sleeve.

Preferably, the insulating sleeve includes at least two mutually independent insulating cavities, at least two jacks correspond to at least two insulating cavities 531, and the at least two second terminals are respectively mounted into the respective jacks and the insulation cavities.

Preferably, the connection structure further comprises a wire pressing plate mounted in the insulating sleeve, a wire passing channel is formed between the wire pressing plate and the side wall of the insulating sleeve, and the second wire passes through the wire passing channel.

Preferably, one of the insulating sleeve and the wire pressing plate is provided with a positioning protrusion, the other one of the insulating sleeve and the wire pressing plate is provided with a positioning groove, and the positioning protrusion is matched with the positioning groove to realize that the wire pressing plate is circumferentially fixed relative to the insulating sleeve.

The disclosure further includes a garden tool comprising a first rod connected with one of a working head and a power source, a second rod connected with the other one of the working head and the power source, and a connection structure, the connection structure is used for realizing the mechanical connection and the electrical connection between the first rod and the second rod, and comprises a first terminal arranged on the first rod and a second terminal arranged on the second rod, the first terminal is connected with a first wire, the second terminal is connected with a second wire, the first terminal and the second terminal are connected to transmit the power of the power source to the working head through the first wire and the second wire, the connection structure further comprises a second base mounted in the second rod, the second base comprising at least two jacks independent of each other, the jack comprises a guiding hole and an assembling hole, the head end of the second terminal is fixed on the assembling hole, and the first terminal can be connected with the second terminal through the guiding hole, wherein, the shortest distance between the second terminal and the end surface of the guiding hole where the second terminal is positioned is at least 3.2 mm, and the diameter of the guiding hole is not more than 6.4 mm.

The disclosure further includes a garden tool comprising a first rod connected with one of a working head and a power source, a second rod connected with the other one of the working head and the power source, and a connection structure, the connection structure is used for realizing the mechanical connection and the electrical connection between the first rod and the second rod, and comprises a first terminal arranged on the first rod and a second terminal arranged on the second rod, the first terminal is connected with a first wire, the second terminal is connected with a second wire, the first terminal and the second terminal are connected to transmit the power of the power source to the working head through the first wire and the second wire, the connection structure further comprises a first base mounted in the first rod, at least two first terminals are included, the at least two first terminals are mutually independently fixed on the first base, the front end of each first terminals is connected with the first wire, and the rear end of each first terminal extends out of the first base, and the creepage distance between the front ends of the first terminals and the inner wall of the first rod is at least 4.8 mm.

It can be seen from the above technical solutions that the present disclosure has many outstanding substantive technical characteristics. After the implementation of the technical solution of the disclosure, its remarkable technical progress is mainly reflected in:

(1) by the provision of a second base mounted in the second rod, and the second base comprising at least two relatively independent jacks into which at least two second terminals are respectively mounted, a reliable electrical insulation is formed between the second terminals and the second rod, thereby allowing the working head to operate with direct current or alternating current of 0-125V and having high electrical safety.

(2) By setting the shortest distance from each second terminal to the end surface of the second rod, the surface being close to the first rod to be at least 15 mm, and setting the shortest distance from each second terminal to the inner wall of the second rod to be not more than 12.5 mm; or, setting the shortest distance from the second terminal to the end surface of the guiding hole where the second terminal is located to be at least 3.2 mm, and setting the diameter of the guiding hole to be not more than 6.4 mm, the hand or other parts of the body of an operator are prevented from touching the electrified body, thereby allowing the working head to operate with direct current or alternating current of 0-125V and having high electric safety.

(3) By setting the creepage distance between the front end and/or the rear end of the first terminal and the inner wall of the first rod to be at least 4.8 mm, electrical insulation between the front end and/or the rear end of the first terminal and the inner wall of the first rod is formed, thereby allowing the working head to operate with direct current or alternating current of 0-125V and having high electrical safety.

DETAILED DESCRIPTION

The present disclosure will be described in detail below with reference to embodiments shown in the drawings. However, these embodiments are not intended to limit the present disclosure, and structural or functional changes made by those skilled in the art according to these embodiments are included in the scope of the present disclosure.

Figure 1:
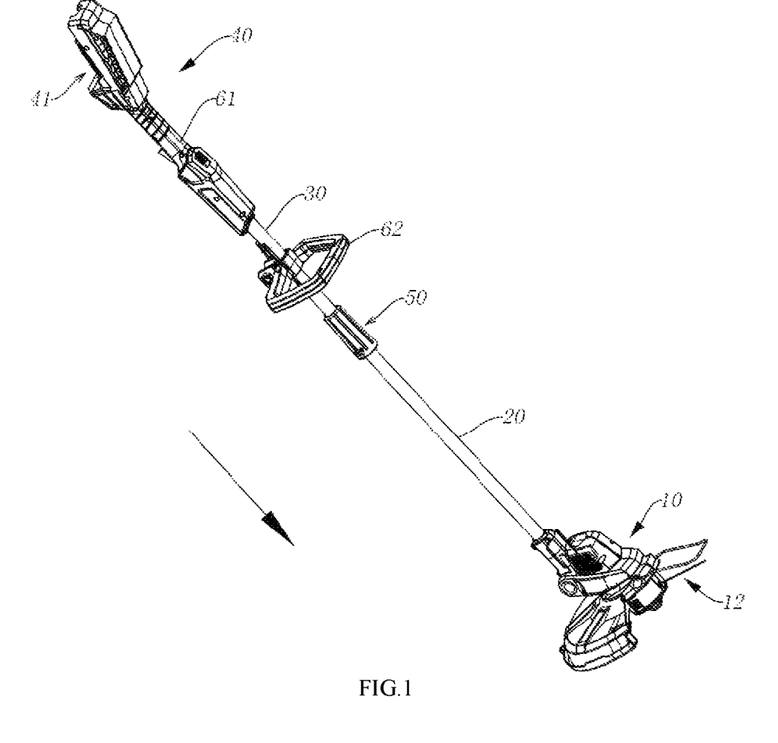
FIG. 1 is an isometric view of a grass trimmer according to a preferred embodiment of the present disclosure.

The present disclosure takes a grass trimmer as an example for specific description. Referring to FIG. 1, the grass trimmer includes a connecting rod assembly, a front assembly 10 connected to the front end of the connecting rod assembly, and a rear assembly 40 connected to the rear end of the connecting rod assembly. The front assembly 10 is connected to a working head 12, the rear assembly 40 is connected to a battery pack (not shown) as a power source, wherein the battery pack is detachably mounted on the battery pack mounting portion 41, and the battery pack supplies power to the working head to realize rotary cutting. For the front and rear here, the direction of the arrow in the drawing toward the working head is defined as the front, and the reverse direction is the rear. In other embodiments, the power source may also be an AC power source, such as city power, also known as mains frequency AC power. The city power can be connected to the rear assembly 40 by means of a plug device.

The connecting rod assembly comprises a front rod 20, a rear rod 30 and a connection structure 50, wherein the front end of the front rod 20 is connected with the front assembly 10, the rear end of the rear rod 30 is connected with the rear assembly 40, namely, the front rod 20 is connected with the working head, the rear rod 30 is connected with the battery pack, and the rear end of the front rod 20 is mechanically and electrically connected with the front end of the rear rod 30 through the connection structure 50. The rear rod 30 is further provided with at least one handle, and in the present embodiment, the rear rod 30 is provided with two handles, namely a first handle 61 extending in substantially the same direction as the rear rod 30, and a second handle 62 located between the first handle 61 and the connection structure 50, wherein the second handle 62 is movably connected to the rear rod 30 to facilitate position adjustment. The front rod 20 and the rear rod 30 here are only distinguished by names, such as a first rod and a second rod, and the two rods can be replaced as long as one of the first rod and the second rod is connected with the working head and the other one is connected with the power source.

Figure 2:
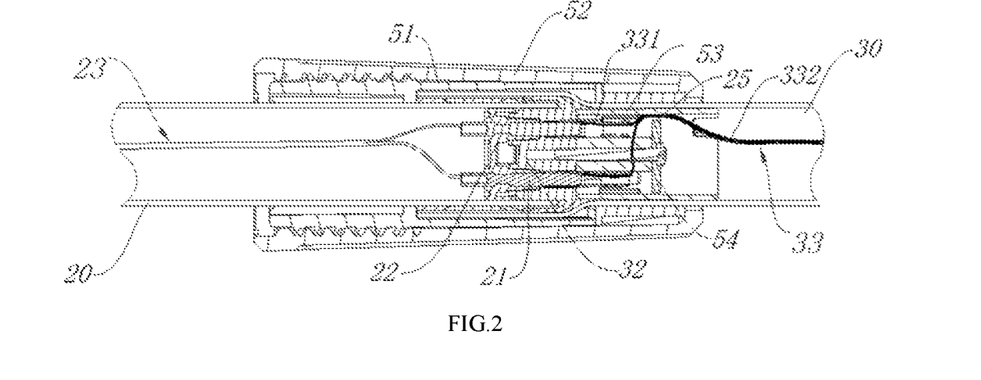
FIG. 2 is a cross-sectional schematic view of the connection structure of the grass trimmer in FIG. 1, wherein the front and rear rods are connected, and the first and second electrical connection ends are in a fully connected state.
Figure 3:
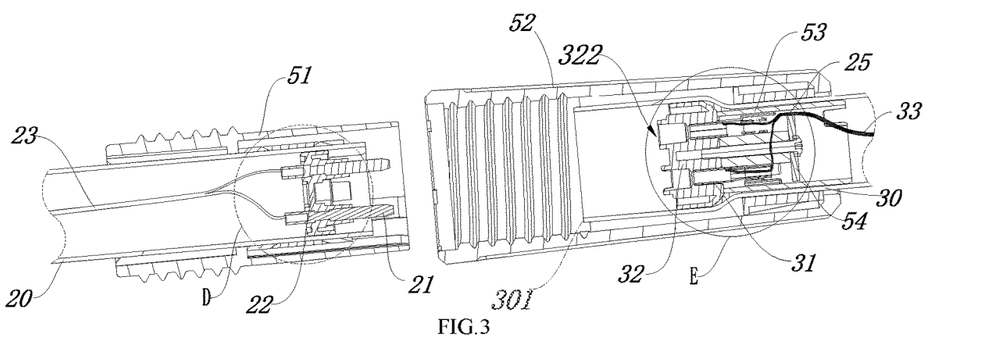
FIG. 3 is a schematic cross-sectional view of the connection structure of the grass trimmer in FIG. 1, wherein the front and rear rods are separated.
Figure 4:
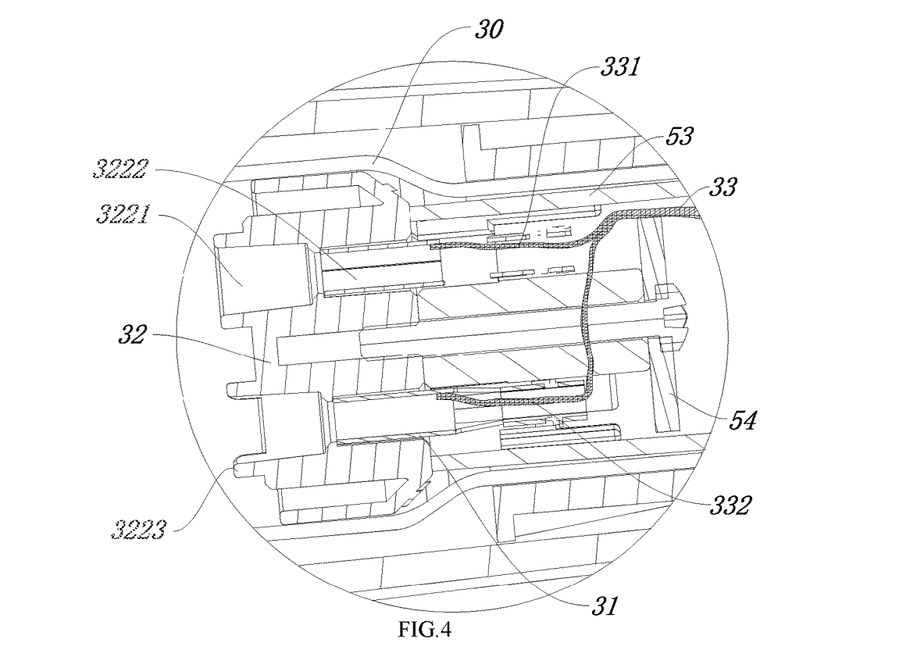
FIG. 4 is an enlarged schematic view of the portion E in FIG. 3.

As shown in FIGS. 2 to 4, the connection structure 50 for connecting the front rod 20 and the rear rod 30 includes a mechanical connection and an electrical connection, wherein the mechanical connection is achieved by a fit between an external thread provided on the front rod 20 and an internal thread provided on the rear rod 30. In the present embodiment, preferably, the rear end of the front rod 20 is fixedly connected to a first sleeve 51 at least along the length direction of the rod, the first sleeve 51 is sleeved on the rear end of the front rod 20, and the exterior of the first sleeve 51 is provided with external threads. The front end of the rear rod 30 is fixedly connected with a second sleeve 52 at least along the length direction of the rod, the second sleeve 52 is sleeved on the front end of the rear rod 30, the interior of the second sleeve 52 is provided with internal threads, and the first sleeve 51 can extend into the second sleeve 52 to realize the mechanical connection of the front rod 20 and the rear rod 30 through the external threads and the internal threads. When the front rod 20 and the rear rod 30 are connected, the front rod 20 and the rear rod 30 partially overlap in the rod length direction, and the first sleeve 51 and the second sleeve 52 also partially overlap in the rod length direction, that is, the front rod 20 extends into the rear rod 30, and the first sleeve 51 extends into the second sleeve 52. In order to match the front rod 20 and the rear rod 30 after connection, the diameters of the front rod 20 and the rear rod 30 are approximately equal, wherein the front end of the rear rod 30 is configured as a flared end, and the inner diameter of the flared end is slightly larger than the outer diameter of the front rod 20, so that the rear rod 30 can be sleeved at the rear end of the front rod 20. In addition, the cross section of the second sleeve 52 is preferably configured as trapezoidal, with the larger end facing the front rod 20, so that the first sleeve 51 can be easily extended into the second sleeve 52 to achieve a threaded connection therebetween.

The electrical connection includes a first electrical connection end provided at the front rod 20 and a second electrical connection end provided at the rear rod 30, preferably, the first electrical connection end is configured as a male terminal including a first terminal 21 and a first base 22 for fixing the first terminal 21, the first base 22 is made of an insulating material and is fixed to the inside of the rear end of the front rod 20, wherein the first terminal 21 passes through the first base 22 along the axial direction of the front rod 20, and in the present embodiment, at least two first terminals 21 are included, and the at least two first terminals pass through the first base 22 mutually independently of each other. The first terminal 21 is hidden in the first sleeve 51, the first terminal front end 211 is connected to the front wire 23, and the first terminal rear end 212 extends out from the first base 22. The second electrical connection is configured as a female end including the second terminal 31, wherein the first terminal rear end 212 is selectively connected with the second terminal 31.

Figure 5:
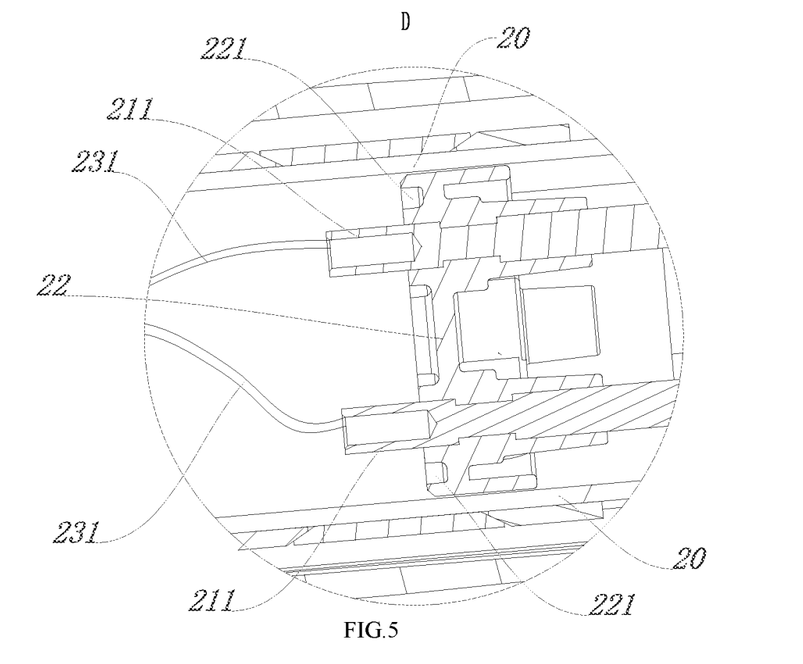
FIG. 5 is an enlarged schematic view of the portion D in FIG. 3.
Figure 6:
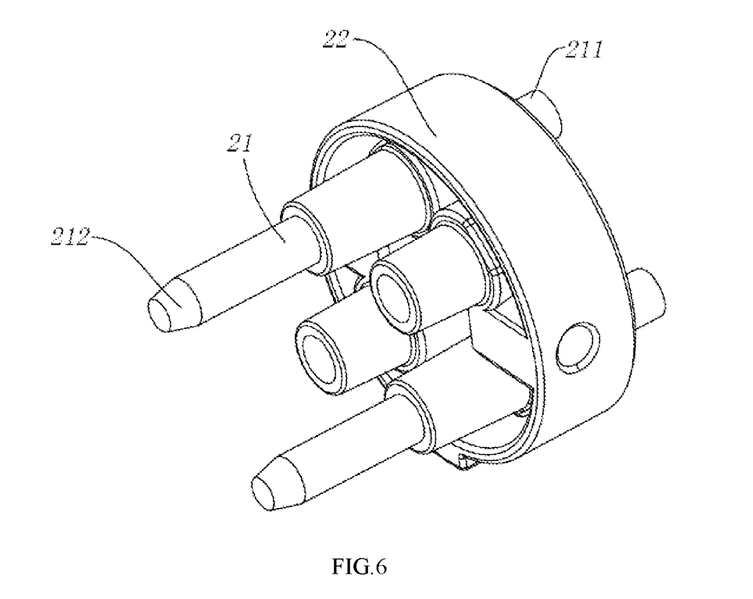
FIG. 6 is an isometric view of the first electrical connection end of the connection structure in FIG. 3.

Referring to FIG. 5, a creepage distance between the first terminal front end 211 and the inner wall of the front rod 20 is at least 4.8 mm. And optionally, the electrical gap between the first terminal front end 211 and the inner wall of the front rod 20 is at least 2.5 mm.

Further, the first base 22 is provided with a groove 221, the groove 221 is located between the first terminal front end 211 and the inner wall of the first rod 20, and the creepage distance between the first terminal front end 211 and the inner wall of the front rod 20 is formed through the groove 221. The groove 221 provides a creepage distance of at least 4.8 mm between the first terminal front end 211 and the inner wall of the front rod 20.

Figure 13:
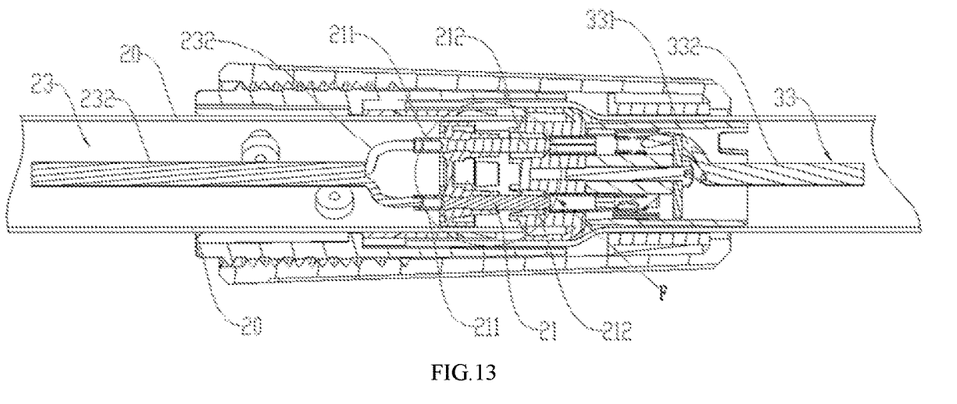
FIG. 13 is another cross-sectional schematic view of the connection structure of the grass trimmer in FIG. 1, wherein the front and rear rods are connected, and the first and second electrical connection ends are in a connected condition just prior to coming into contact with each other.

Referring to FIG. 13, the front wire 23 includes at least two first branch wires 231 and a first insulating sheath 232 wrapping the at least two first branch wires 231, each of the first branch wires 231 has its own second insulating sheath, and each of the first branch wires 231 is partially exposed from the first insulating sheath 232 to be connected to the respective first terminal 21. Wherein the creepage distance between the exposed portion of each first branch wire 231 and the inner wall of the front rod 20 is at least 2.4 mm. And preferably, the length of the exposed portion of each first branch wire 231 is not more than 10 mm.

Figure 14:
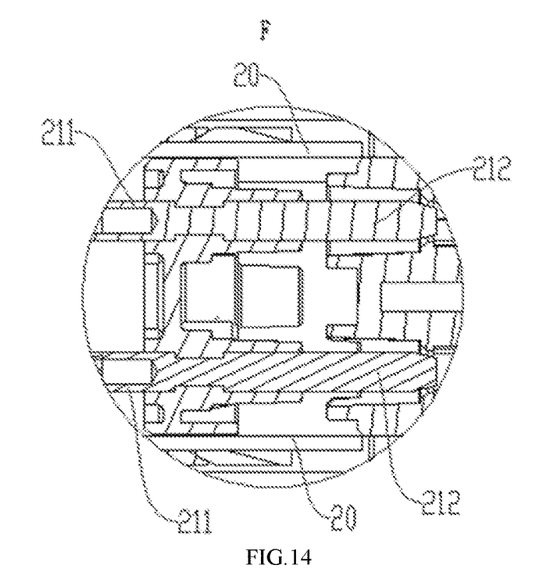
FIG. 14 is an enlarged schematic view of the portion F in FIG. 13.

In addition, referring to FIGS. 13 and 14, the creepage distance between the first terminal rear end 212 and the inner wall of the front rod 20 is at least 4.8 mm.

Preferably, the second terminal 31 is housed in the front end of the rear rod 30, and the front end of the rear rod 30 is housed in the second sleeve 52. When the front lever 20 is not connected and the power source is turned on, the second terminal 31 is directly connected to the battery pack through the rear wire 33 and is electrified, and the structure in which the second terminal 31 is not exposed is adopted, so that the user can be effectively prevented from touching the second terminal 31 and getting an electric shock in this case.

Further referring to FIGS. 5 to 11, the second electrical connection end further includes a second base 32 made of an insulating material and an insulating sleeve 53 made of an insulating material. The second base 32 includes at least two mutually independent jacks 322, and the insulating sleeve 53 includes at least two mutually independent insulating cavities 531, and the jacks 322 correspond to the insulating cavities 531. At least two second terminals 31 are respectively mounted into the respective jacks 322 and the insulation cavities 531. The second terminal head end 311 may be connected to the first terminal head end 211 which is inserted into the jack 322, and the second terminal tail end 312 is connected to the rear wire 33.

Figure 12:
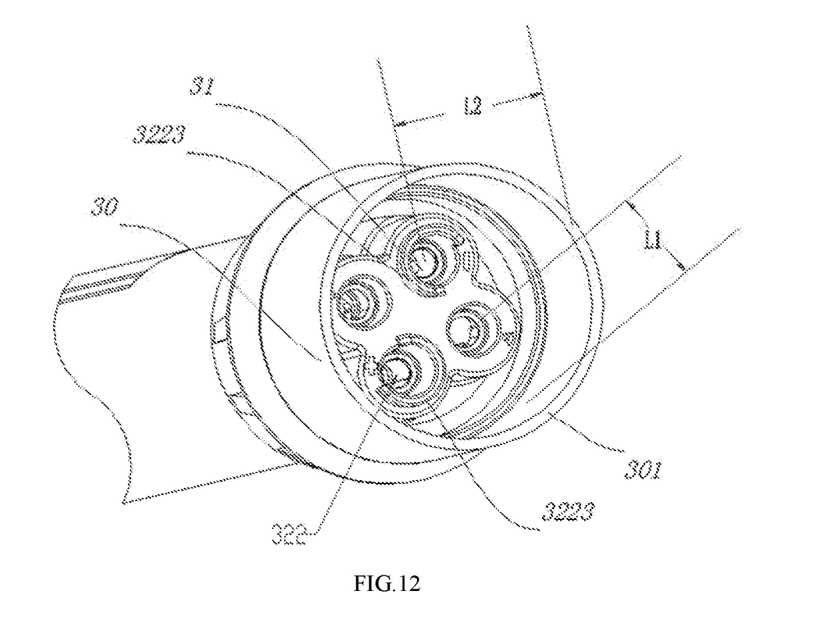
FIG. 12 is an isometric view of the portion of the rear rod near the second electrical connection end.

Referring to FIGS. 3 and 12, the shortest distance L2 from each second terminal 31 to the end surface of the second rod 30, the surface being near the distal end 301 of the first rod 20 is at least 15 mm, and the shortest distance L1 from each second terminal 31 to the inner wall of the second rod 30 is not more than 12.5 mm.

Further, the second terminals 31 have center lines, and the center line of each second terminal 31 is coincided with the center line of the jack 322 in which the second terminal 31 is located, wherein the shortest distance L1 from the center line of the second terminal 31 to the inner wall of the second rod 30 is not more than 12.5 mm.

Referring to FIG. 4, the jack 322 includes a guiding hole 3221 and a assembly hole 3222, the head end 311 of the second terminal 31 is fixed to the assembly hole 3222, and the first terminal 21 can be connected to the second terminal 31 through the guiding hole 3221, wherein the shortest distance L3 from the second terminal 31 to the end surface of the guiding hole 3221 where the second terminal 31 is located is at least 3.2 mm, and the diameter of the guiding hole 3221 is not more than 6.4 mm.

Further, the shortest distance L3 from the second terminal 31 to the end surface of the guiding hole 3221 where the second terminal 31 is located is at least 4.8 mm.

Referring to FIGS. 4 and 12, the guiding hole 3221 has a protruding portion 3223 extending from the end surface thereof in the direction approaching the first terminal 21. Preferably, the protruding portion 3223 has a ring shape with a notch.

Figure 7:
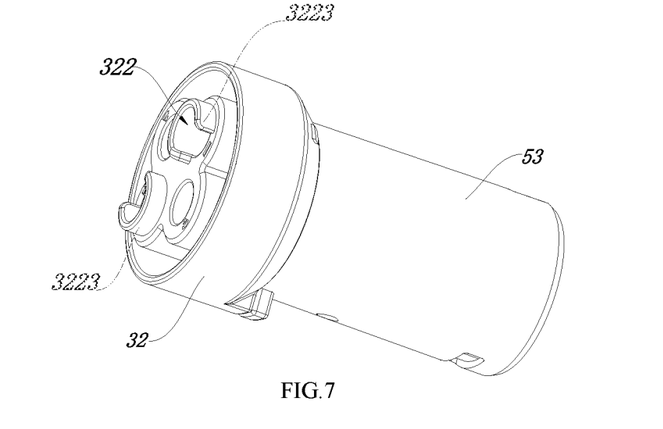
FIG. 7 is an isometric view of the second electrical connection end of the connection structure in FIG. 3.
Figure 8:
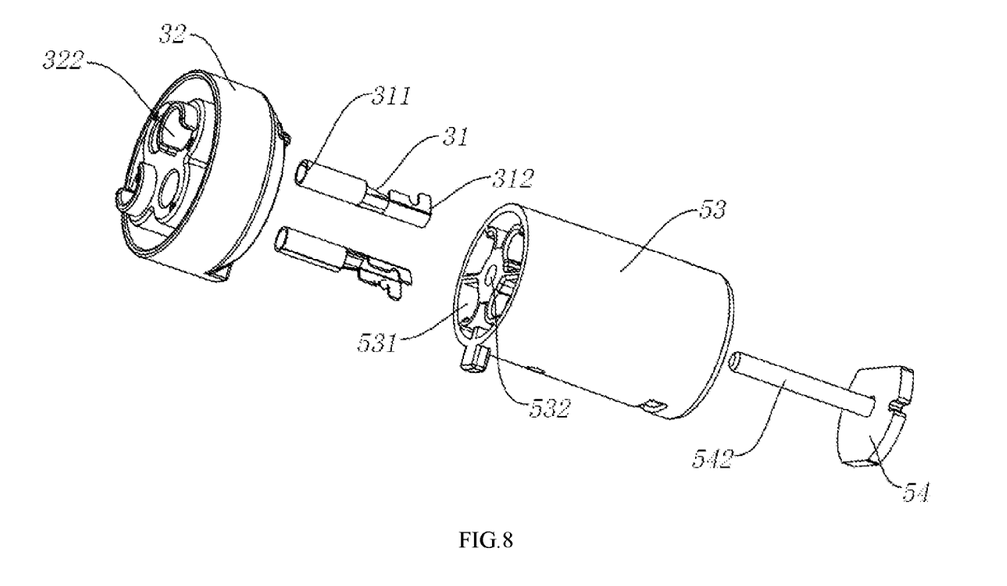
FIG. 8 is an exploded isometric view of the second electrical connection end in FIG. 7.
Figure 9:
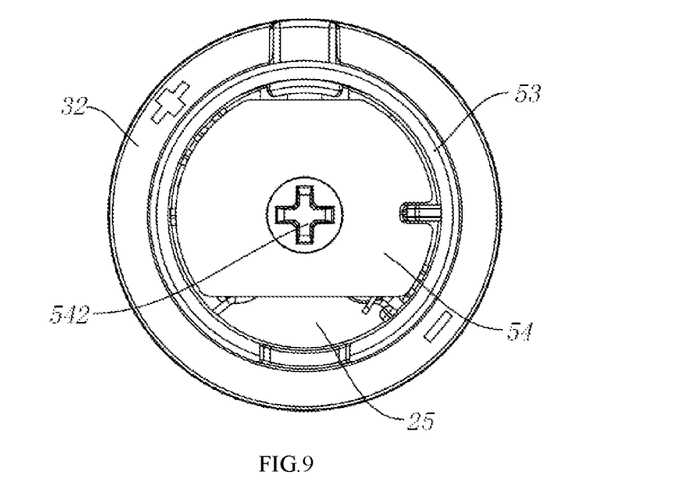
FIG. 9 is a bottom schematic view of the second electrical connection end in FIG. 7.
Figure 10:
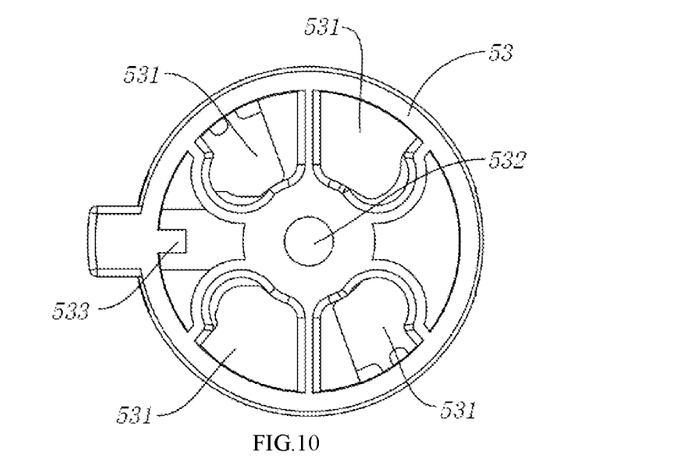
FIG. 10 is a top schematic view of the second electrical connection end in FIG. 7.
Figure 11:
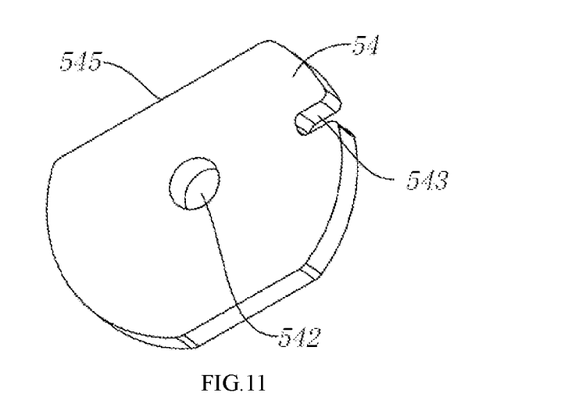
FIG. 11 is an isometric view of the wire pressing plate of the second connection terminal in FIG. 7.

The bottom of the second electrical connection end is provided with a wire pressing plate 54 fixed by a screw 542, and the screw 542 extends into a screw hole 532 in the center of the insulating sleeve 53 to fix the wire pressing plate 54 relative to the insulating sleeve 53. A wire passing channel 25 is formed between the wire pressing plate 54 and the side wall of the insulating sleeve 53 and is used for the rear wire 33 to pass through. In the present embodiment, the wire pressing plate 54 includes a straight edge 545, and the wire passing channel 25 is formed between the straight edge 545 and the sidewall of the insulating sleeve 53. The side wall of the insulating sleeve 53 is provided with a positioning protrusion 533 which is matched with a positioning groove 543 on the wire pressing plate 54 to prevent the wire pressing plate 54 from rotating, so that the wire pressing plate 53 is circumferentially fixed relative to the insulating sleeve 54. The rear wire 33 includes at least two second branch wires 331 and a third insulating sheath wrapping the at least two second branch wires 331. Each of the second branch wires 331 has its own fourth insulating sheath, each of the second branch wires 331 is partially exposed from the third insulating sheath 332 to be electrically connected to the respective second terminal 31, and the exposed portion of each second branch wire 331 is located within the insulating sheath 53. The rear wire 33 passes through the wire passing channel 25, that is, the rear wire 33 can be fixed by the wire pressing plate 54, and each of the second branch wires 331 is prevented from being displaced within the insulating sheath 53. For the portion of each second branch wire, the portion being exposed from the third insulating sheath 332, because of the double insulation of its own insulating sheath and the insulating sleeve 53, the front rod 20 made of metal or the rear rod 30 made of metal will not be electrified due to insulation failure.

The present disclosure realizes the holistic double insulation of the rear wire 33 by housing the portion of each second branch wire 331 of the rear wire, the branch wire being exposed from the third insulating sheath in the insulating sleeve 53 and fixing the same by the wire pressing plate 54. In the above embodiment, the insulating sleeve 53 is used for the rear rod 30. In other embodiments, the insulating sleeve structure may also be used for the front rod 20 or for both the front rod 20 and the rear rod 30. The present disclosure takes a grass trimmer as an example to explain, and the example certainly can also be other garden tools, such as other garden tools, such as garden tools needing two-section rod connection, e.g. a cutting and irrigating machine, a trimming machine.

It should be understood that although the specification has been described in terms of embodiments, not each embodiment only contains one independent technical solution, and the recitation in the specification is merely for the sake of clarity. Those skilled in the art should take the specification as a whole, and the technical solutions in each embodiment can be properly combined to form other embodiments that may be appreciated by those skilled in the art.

The series of detailed descriptions mentioned above are only specific descriptions of feasible embodiments of the present disclosure, and are not intended to limit the scope of the present disclosure, and equivalent embodiments or modifications that do not depart from the spirit of the present disclosure are intended to be included within the scope of the present disclosure.

The invention claimed is:
1. A garden tool comprising:
a connecting rod assembly;
a working head connected to one end of the connecting rod assembly; and
a power source connected to another end of the connecting rod assembly;
the connecting rod assembly including a first rod connected to the working head, a second rod connected to the power source, and a connection structure for implementing a mechanical connection and an electrical connection between the first rod and the second rod;

the connection structure including a first terminal arranged on the first rod and a second terminal arranged on the second rod, the first terminal being connected to a first wire, the second terminal being connected to a second wire, the first terminal and the second terminal connectable to transmit power of the power source to the working head through the first wire and the second wire;

the connection structure further including a second base mounted in the second rod, the second base including at least two jacks independent of each other, and at least two second terminals are respectively mounted in respective jacks;

the connection structure further including a first base mounted in the first rod and at least two of the first terminals, the at least two first terminals being mutually independently fixed to the first base, front ends of the first terminals being connected with the first wire, and rear ends of the first terminals extending out of the first base, the first base defining a groove positioned between the front ends of the first terminals and an inner wall of the first rod, a creepage distance between the front ends of the first terminals and an inner wall of the first rod being formed by the groove.

2. The garden tool according to claim 1, wherein a shortest distance from each second terminal to an end surface of the second rod when the end surface is near a distal end of the first rod is at least 15 mm, and the shortest distance from each second terminal to an inner wall of the second rod is not more than 12.5 mm.

3. The garden tool according to claim 2, wherein the second terminals each have respective center lines, and the center line of each second terminal is aligned with a center line of the jack in which each second terminal is located, wherein the shortest distance from the center line of each second terminal to the inner wall of the second rod is not more than 12.5 mm.

4. The garden tool according to claim 1, wherein each jack defines a guiding hole and an assembly hole, a head end of the second terminal being fixed to the assembly hole, the first terminal being connectable to the second terminal through the guiding hole, wherein a shortest distance from the second terminal to an end surface of the guiding hole where the second terminal is located is at least 3.2 mm, and the diameter of the guiding hole is not more than 6.4 mm.

5. The garden tool according to claim 4, wherein the shortest distance from the second terminal and the end surface of the guiding hole where the second terminal is located is at least 4.8 mm.

6. The garden tool according to claim 1, wherein the creepage distance is at least 4.8 mm.

7. The garden tool according to claim 1, wherein an electrical gap between the front ends of the first terminals and an inner wall of the first rod is at least 2.5 mm.

8. The garden tool according to claim 4, wherein the guiding hole has a protruding portion extending from the end surface thereof in a direction toward the first terminal.

9. The garden tool according to claim 8, wherein the protruding portion is configured in a ring shape with a notch.

10. The garden tool according to claim 1, wherein the first wire includes at least two first branch wires and a first insulating sheath wrapping the at least two first branch wires, each of the first branch wires having a respective second insulating sheath, each of the first branch wires having a portion exposed through the first insulating sheath to be connected to the respective first terminal, a creepage distance between the exposed portion of each first branch wire and an inner wall of the first rod is at least 2.4 mm.

11. The garden tool according to claim 10, wherein the length of the exposed portion of each first branch wire is not more than 10 mm.

12. A garden tool comprising:
a connecting rod assembly;
a working head connected to one end of the connecting rod assembly; and
a power source connected to another end of the connecting rod assembly;
the connecting rod assembly including a first rod connected to the working head, a second rod connected to the power source, and a connection structure for implementing a mechanical connection and an electrical connection between the first rod and the second rod;
the connection structure including a first terminal arranged on the first rod and a second terminal arranged on the second rod, the first terminal being connected to a first wire, the second terminal being connected to a second wire, the first terminal and the second terminal connectable to transmit power of the power source to the working head through the first wire and the second wire;
the connection structure further including a second base mounted in the second rod, the second base including at least two jacks independent of each other, and at least two second terminals are respectively mounted in respective jacks;
the second wire including at least two second branch wires and a third insulating sheath wrapping the at least two second branch wires, each of the second branch wires having a respective fourth insulating sheath, each of the second branch wires having a portion exposed through the third insulating sheath to be connected to the respective second terminal, the connection structure further including an insulating sleeve disposed in the second rod, the exposed portion of each second branch wire being restricted in the insulating sleeve.

13. The garden tool according to claim 12, wherein the insulating sleeve includes at least two mutually independent insulating cavities, the at least two jacks corresponding to the at least two insulating cavities, the at least two second terminals being respectively mounted into the respective jacks and the insulation cavities.

14. The garden tool according to claim 12, wherein the connection structure further includes a wire pressing plate mounted in the insulating sleeve, a wire passing channel being defined between the wire pressing plate and a side wall of the insulating sleeve, the second wire passing through the wire passing channel.

15. The garden tool according to claim 14, wherein one of the insulating sleeve and the wire pressing plate includes a positioning protrusion, and the other one of the insulating sleeve and the wire pressing plate defines a positioning groove, the positioning protrusion being configured to match the positioning groove so that the wire pressing plate is circumferentially fixed relative to the insulating sleeve.

* * * * *